United States Patent [19]

Toda

[11] Patent Number: 4,705,351

[45] Date of Patent: Nov. 10, 1987

[54] TWO LENS OPTICAL PACKAGE AND METHOD OF MAKING SAME

[75] Inventor: Minoru Toda, Princeton Junction, N.J.

[73] Assignee: RCA Corporation, Princeton, N.J.

[21] Appl. No.: 801,828

[22] Filed: Nov. 26, 1985

[51] Int. Cl.⁴ .............................................. G02B 6/32
[52] U.S. Cl. ............................ 350/96.18; 350/96.20; 350/416; 350/320
[58] Field of Search ............... 350/96.15, 96.16, 96.18, 350/96.20, 414, 416; 357/74

[56] References Cited

U.S. PATENT DOCUMENTS

| | | | |
|---|---|---|---|
| 4,257,672 | 3/1981 | Balliet | 350/96.18 X |
| 4,269,648 | 5/1981 | Dakss et al. | 156/293 |
| 4,307,934 | 12/1981 | Palmer | 350/96.20 |
| 4,380,365 | 4/1983 | Gross | 350/96.18 |
| 4,383,731 | 5/1983 | Simon et al. | 350/96.18 |

FOREIGN PATENT DOCUMENTS 60-61707  4/1985  Japan ................................ 350/96.15

OTHER PUBLICATIONS

Sumida et al., "Lens Aberration Effect on a Laser-Diode-to-Single-Mode-Fibre Coupler," *Electronics Lett.*, vol. 18, No. 14, Jul. 1982, pp. 586–587.

Kawano et al., "Combination Lens Method for Coupling a Laser Diode to a Single-Mode Fiber," *Appl. Optics*, vol. 24, No. 7, Apr. 1985, pp. 984–989.

Kenji Kawano et al., "Laser Diode Module for Single-Mode Fiber Using Modified Confocal Two Lens Method with Divided Second Lens" (Translation provided), pp. 2–76, Nat'l. Convention of Opt. & R.W. Section of Electron. Commun. Society of Japan, 1984.

Kenji Kawano et al., "Proposal of New Combination Lens Methods for Laser Diode Module Using Single-Mode Fibers", pp. 17–24, (Translation provided), OQE 84-85.

M. Saruwatari et al., "Efficient Laser Diode to Single-Mode Fiber Coupling Using a Combination of Two Lenses in Confocal Condition", *Jour. of Quantum Elect.*, vol. QE-17, No. 6, Jun. 1981, pp. 1021–1027.

I. Ladany et al., "Wedge Coupling of Lasers into Multimode Fibers", *Applied Optics*, vol. 22, No. 7, Apr. 1, 1983, pp. 960–961.

*Primary Examiner*—John Lee
*Attorney, Agent, or Firm*—Harley R. Ball; Marvin Snyder

[57] ABSTRACT

An optical package includes a first lens assembly and a second lens assembly aligned such that their optical axes are common. The first lens assembly comprises a divergent light source disposed along the optical axis of a first lens such that the object distance is less than the focal length of the first lens. The second lens assembly comprises a body, having a light acceptance angle less than the angle of divergence of the light source, disposed along the optical axis of a second lens such that the object distance is greater than the focal length of the second lens. The assemblies are disposed such that the images formed by each assembly alone correspond in position along the common axis thereby coupling the light from the source into the body.

The package is fabricated by placing the source within the focal length of the first lens and the body is placed outside the focal length of the second lens, forming first and second lens assemblies, respectively. The assemblies are placed along a common axis such that a virtual image of the source, which would be formed by the first assembly alone, and a real image of the body, which would be formed by the second assembly alone, are aligned along the common axis.

21 Claims, 9 Drawing Figures

TWO LENS OPTICAL PACKAGE AND METHOD OF MAKING SAME

This invention relates to an optical package comprising a first lens assembly including a light source, and a second lens assembly including a body and more particularly concerns coupling light from a source of divergent rays, such as a semiconductor laser, into an optical fiber.

BACKGROUND OF THE INVENTION

A primary concern in using an optical fiber as a light-conducting means is the efficient coupling of light into the end of the fiber. Since the planar end of an optical fiber has a narrow light-acceptance angle, only a portion of the light directed at the fiber end actually enters the fiber core. This problem is compounded when light from a source of divergent rays, such as a semiconductor laser, is coupled into a small diameter core of a single mode fiber. For example, a typical semiconductor laser has a beam divergence angle of about 40° and a single mode fiber has a light-acceptance angle of about 6°.

In addition to this inherent problem, laser-to-fiber couplings are also characterized by low tolerances. For example, when a laser and fiber are axially aligned along the optical axis of the fiber, the light emanating from a 4 micrometer ($\mu$m) wide lasing spot is directed at the end of a 10 $\mu$m diameter fiber core. Under these circumstances even submicron misalignment along the orthogonal axes can greatly reduce the percentage of power detected at a second end of the fiber.

Attempts to attach small lenses to the end of the fiber or to impart various shapes to the fiber end, by etching, grinding or melting, can increase the light-acceptance angle. These solutions, however, are characterized by poor reproducibility and damage to the fiber end. Finally, although these fiber-end lenses serve to increase the light acceptance angle, the device-to-fiber alignment must still be within a tolerance of 1 $\mu$m or less.

Higher tolerance systems, i.e. systems wherein greater leeway in the orthogonal directions is acceptable, involve separate optical components interposed between the laser and fiber. A prior art system using three lenses interposed between the laser and fiber has provided tolerances on the order of several micrometers by producing a magnified image of the laser. However, efforts have been directed at reducing the number of components in a package since each additional component reduces the likelihood of an accurately aligned package. Two-lens, high tolerance systems which typically use a spherical lens adjacent the laser are characterized by spherical aberrations because the outermost portions of the spherical lens are utilized to collimate the highly divergent rays. Another two-lens system is the confocal system wherein the two lenses are fixed such that their principal axes are separated by the sum of their focal lengths. Although this arrangement provides higher tolerances for the positioning of the lenses, the final positioning of the fiber must be within a few micrometers.

Therefore, a high tolerance, high efficiency optical package using a minimum of optical components and a method for its assembly has been sought.

SUMMARY OF THE INVENTION

An optical package includes a first lens assembly and a second lens assembly aligned such that their optical axes are common. The first lens assembly comprises a divergent light source disposed along the optical axis of a first lens such that the object distance is less than the focal length of the first lens. The second lens assembly comprises a body, having a light acceptance angle less than the angle of divergence of the light source, disposed along the optical axis of a second lens such that the object distance is greater than the focal length of the second lens. The assemblies are disposed such that the images formed by each assembly alone correspond in position along the common axis thereby coupling the light from the source into the body.

To fabricate the package, the source is placed within the focal length of the first lens and the body is placed outside the focal length of the second lens, forming first and second lens assemblies, respectively. The assemblies are placed along a common axis such that a virtual image of the source, which would be formed by the first assembly alone, and a real image of the body, which would be formed by the second assembly alone, are aligned along the common axis.

DETAILED DESCRIPTION OF THE PREFERRED EMBODIMENTS

Figure 1:
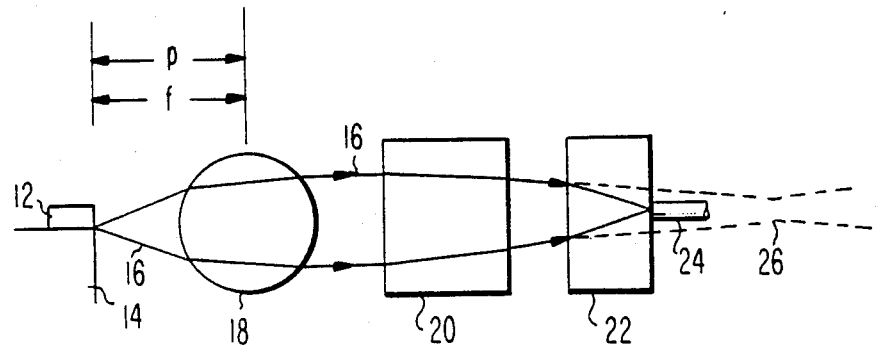
FIG. 1 is a three lens optical package of the prior art.

A three lens optical package 10 of the prior art as shown in FIG. 1 includes a source 12 on a mount 14. Rays 16, which are shown to be divergent as they emanate from the source 12, enter a first lens 18. The object distance p from the principal axis of the first lens 18 to the source 12 is equal to the focal length f of the first lens 18. The rays 16 then enter a second lens 20 and a third lens 22 before entering the fiber 24. The fiber 24 is inside the focal length of the third lens 22 and typically has a light acceptance angle less than the divergence angle of the light source 12. The magnified real image of the source 12, assuming no third lens 22, and the magnified virtual image of the fiber 24, assuming the fiber 24 to be a light source, are aligned in the position indicated by the dotted lines 26.

Figure 2:
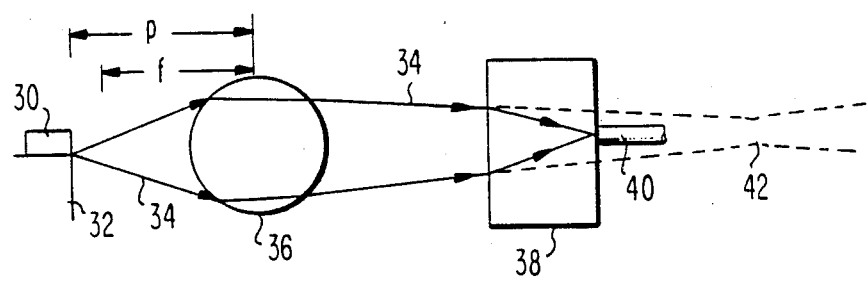
FIG. 2 is a two lens optical package of the prior art.

A two lens optical package 28 of the prior art as shown in FIG. 2 includes a source 30 mounted on a mount 32. Rays 34 from the source 30 enter a first lens 36. The first lens 36 is a sphere and the object distance p is greater than the focal length f. The rays 34 then enter a second lens 38 where they are coupled into a fiber 40. Again, as in the three lens package a real image of the source 30 and a virtual image of the fiber 40 are aligned in the position indicated by the dotted lines 42. In order for this two lens package 28 to work, the rays 34 must be converging as they exit the first lens 36 so that absent the second lens 38, a real image of the source 30 is formed. For this to occur the source 30 is positioned beyond the focal length f of the first lens 36 which causes the rays 34 to pass through the outermost portions of the first lens 36. The resulting spherical aberration of the rays 34 effectively shortens the focal length of the first lens 36 for a portion of the light passing through it. In effect, light passing through the center portion of the lens converges at one focal length and light passing through the outermost portion of the lens, i.e. the marginal rays, converges at a shorter focal length. This severly reduces the coupling efficiency of the package.

Figure 3:
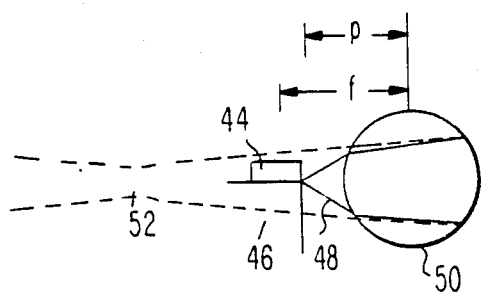
FIG. 3 is an embodiment of a first lens assembly of the invention.

A high tolerance, high efficiency two lens optical package, comprising first and second lens assemblies, is provided by the present invention. The first lens assembly for such a package is shown in FIG. 3 comprising a source 44 on a mount 46. Rays 48 from the source 44, shown to be divergent, are directed to a first lens 50. The ray 48 are actually the most divergent rays of a beam comprising a plurality of divergent rays, i.e. they are the marginal rays of the beam. The source 44 is disposed along the optical axis of the first lens 50 at an object distance p less than the focal length f of the first lens 50 such that a magnified virtual image of the source 44 is formed at the position indicated by the dotted lines 52.

Figure 4:
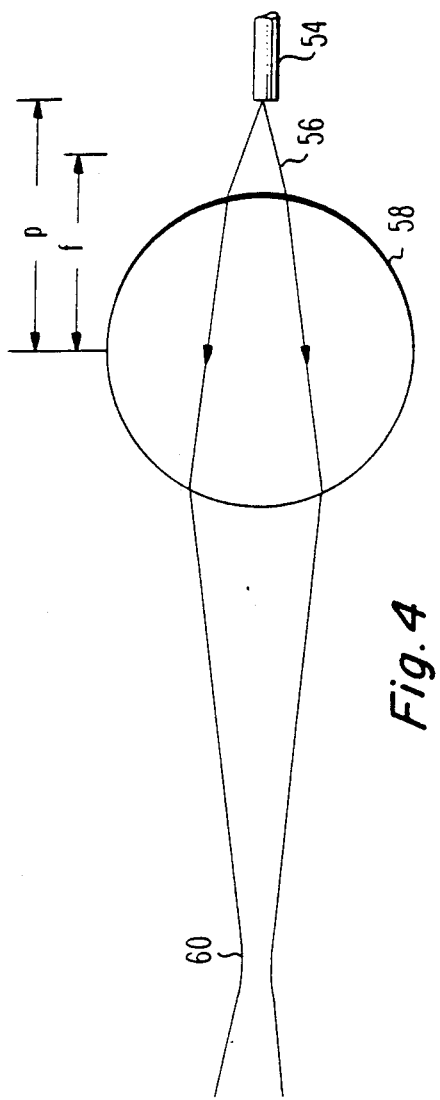
FIG. 4 is an embodiment of a second lens assembly of the invention.

A second lens assembly for the package of the invention as shown in FIG. 4 includes an optical fiber 54. For the purposes of alignment the fiber 54 is assumed to be a light source with rays 56 emanating therefrom. The rays are at the light acceptance angle of the fiber core which is less than the beam divergence angle of the light source 44. The rays 56 enter a second lens 58. The fiber 54 is disposed along the optical axis of the second lens 58 at an object distance p greater than a focal length f of the second lens 58. In this way, a magnified real image of the fiber 54 is formed at the beam waist 60. The focal length for the second lens is defined by $$f = \frac{nR}{2(n-1)}$$

where n is the index of refraction and R is the radius of curvature of the lens. However, since the above formula most accurately defines the focal length for rays passing through the lens near the optical axis, marginal rays passing through outer portions of the lens may be focused at a different point. In fact, the marginal rays undergo spherical aberrations causing them to converge at a shorter focal length. Considering the highly divergent nature of the light rays from a laser, it can be appreciated that the fiber 54 may be placed at an object distance greater than the effective focal length as defined by the marginal rays. This object distance may actually be less than the focal length defined by the above-mentioned formula.

Figure 5:
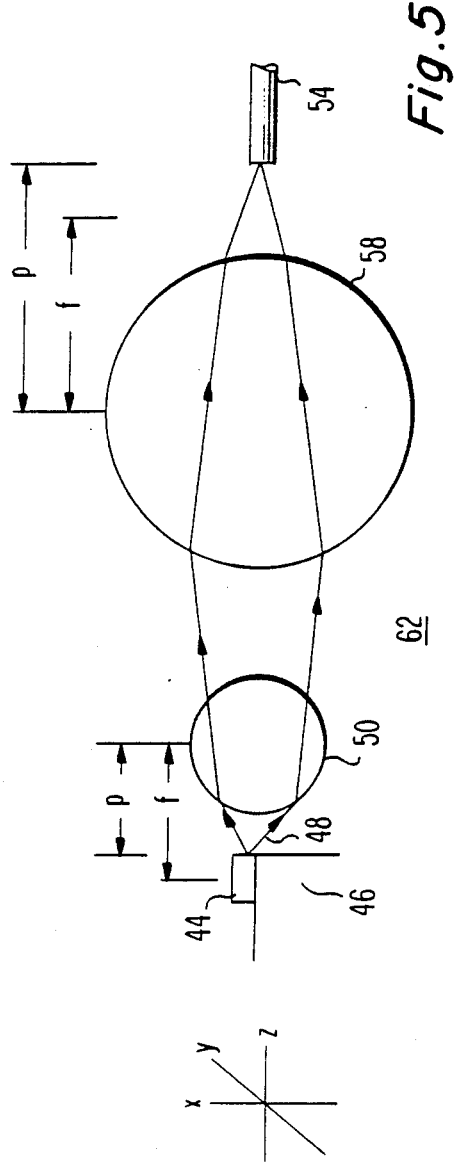
FIG. 5 is an embodiment of an optical package of the invention.

In FIG. 5 the optical package 62 of the invention is illustrated wherein the optical axes of the first and second lenses, 50 and 58, are common. The distance between the two lenses is determined by the alignment of the images 52 and 60 produced by each assembly as shown in FIGS. 3 and 4.

The source 44 can be a light emitting device such as an LED or a laser or may be a light-carrying optical fiber, or an external optical guide. In the case of a laser, the beam width of the marginal rays 48 is typically about 40°. The first lens 50 is spherical, typically having a radius of between about 0.2 and 0.5 millimeters (mm) when used with a laser as the source. The radius of the first lens 50 is preferably about 0.2 to 0.375 mm. While the refractive index of the first lens can be between 1 and 2, it is preferred between 1.75 and 2. Suitable materials for the lens 50 include ruby, sapphire and high-index glass.

The virtual image 52 of the source 44 actually is an image of the light emitting region of the device (or fiber core). The image 52 of the source 44 is generally magnified between about 10 and 30 times by the first lens 50. Thus, a 2 to 4 μm diameter lasing spot will yield a virtual image 52 between about 50 and 100 μm. The fiber 24 is typically a single mode optical fiber having a fiber core on the order of 10 μm in diameter. However, the light rays 48 can be coupled into any light accepting body. For example, a photodetector may be substituted for the fiber 24.

The second lens 58 can be of any type, e.g. a GRIN lens (graded index rod lens) or a spherical lens, as long as it is capable of taking the magnified image from the first lens 50 and coupling it into the body. Spherical lenses found useful generally have radii 3 to 5 times greater than the radius of the first lens 50 since the divergence angle of the laser is about 3 to 5 times greater than the acceptance angle for a single mode optical fiber. Thus the radius of the second lens 58 should be between about 0.6 and 2.5 mm and preferably about 0.6 to 1.25 mm. The index of refraction requirements for the second lens 58 are comparable to those discussed for the first lens 50.

To fabricate the package of the invention, a source, e.g. a laser, is placed on a fixture on an optical bench and directed at the first end of a fiber. The optical axis is defined by the propagation direction of the light. The optical axes of the fiber and lenses are placed on this common axis designated z in FIG. 5. The second end of the fiber is connected to detection means suitable for indicating the percentage of the power from the laser which actually exits the fiber. Suitable means for adjusting all components along the x, y and z axes should be provided. After the optimum alignment of the laser and fiber is done, the first lens is interposed between the laser and fiber along the common z axis such that the object distance of the laser is less than the focal length of that lens. This produces a magnified image of the lasing spot of the laser. The first lens is joined to the fixture, with the laser, in this position. The second lens is interposed between the first lens and the fiber on the common z axis such that the object distance between the second lens and the fiber is greater than the focal length for that lens. At this point the magnified image of the lasing spot is coupled into the fiber. The fiber is joined to the second lens in this position by suitable means. After joining the lenses to their respective components, e.g. by soldering, the two lens assemblies formed can be realigned with one another to correct any misalignment which may occur during the soldering.

The final assembly step is joining the two assemblies to a common base. In the prior art, the final step is typically attaching the fiber to the fixed source and lenses. By coupling the magnified image of the source into the second assembly in the present invention, final assembly can be performed at much higher tolerances. Also, because the source is within the focal length of the first lens, less spherical aberrations occur.

The invention will now be described by the following examples, however, the invention should not be limited to the details therein. Coupling tolerances are typically measured by taking an optimally aligned package and either displacing or deflecting the fiber in the orthogonal (x-y) directions and measuring the variations in the power out of the fiber. The range of deviation at about half of the output power is the alignment tolerance for that system.

EXAMPLE I

An InGaAsP semiconductor laser on a metallized copper heatsink was soldered to a fixture also adapted for a spherical lens. The mounted laser was placed on an optical bench equipped with x, y, z manipulation means. A first end of an optical fiber in a fiber holder was placed along the optical axis defined by the propagation direction of the light from the laser. The second end of the fiber was connected to a means for measuring the power out of the fiber. A spherical ruby lens (first lens) having a radius of 0.375 millimeters (mm), an index of refraction of 1.75, and a focal length of 0.438 mm, was placed on the fixture adjacent the laser such that the optical axis of the lens was common with that defined by the laser. The surface of the first lens was about 17 μm from the front facet of the laser providing an object distance of about 0.392 mm. The exact position of the first lens on the fixture was adjusted for maximum power output, then the lens was soldered to the fixture by appropriate means. Next, a second spherical lens was placed on the fiber holder, along the optical axis interposed between the first lens and the fiber. The second lens was of sapphire having a radius of 1.188 mm, an index of refraction of 1.75 and a focal length of 1.385 mm. The second lens was initially positioned such that the object distance to the fiber was greater than the focal length defined by $$f = \frac{nR}{2(n-1)}$$

i.e. the fiber was more than about 0.200 mm away from the surface of the second lens. The optimum position in the x, y and z directions was found for the second lens and it was soldered to the fiber holder. The fiber was then moved closer to the second lens along the optical axis to compensate for the aberrational effect of the second lens on the marginal rays from the laser. The optimum position was determined when a slight increase in power output was observed.

Figure 6:
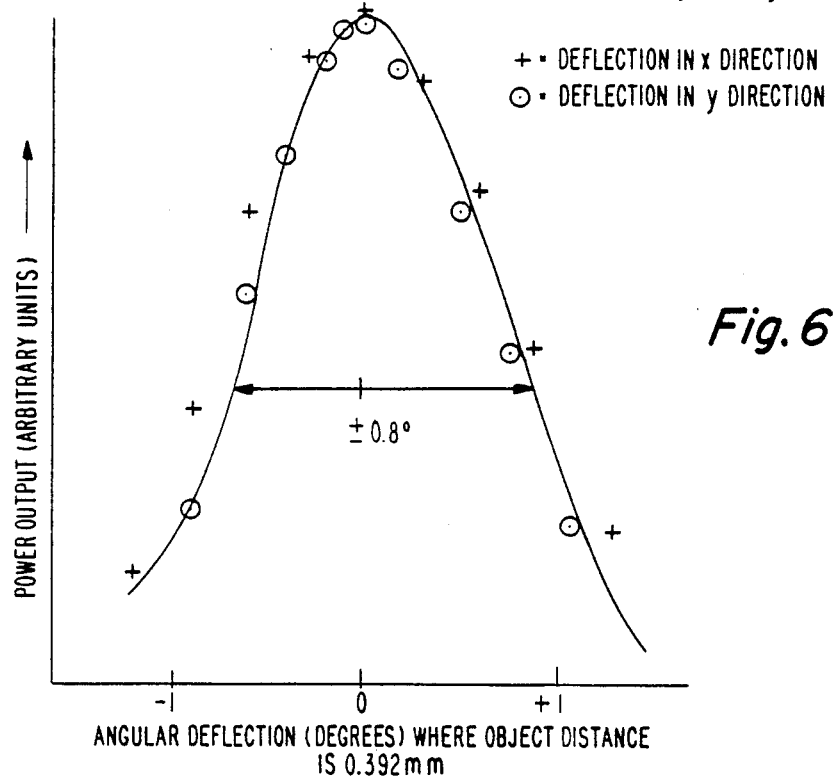
FIG. 6 is a graph showing the power out of the fiber as a function of the angular deflection of the second lens assembly.
Figure 7:
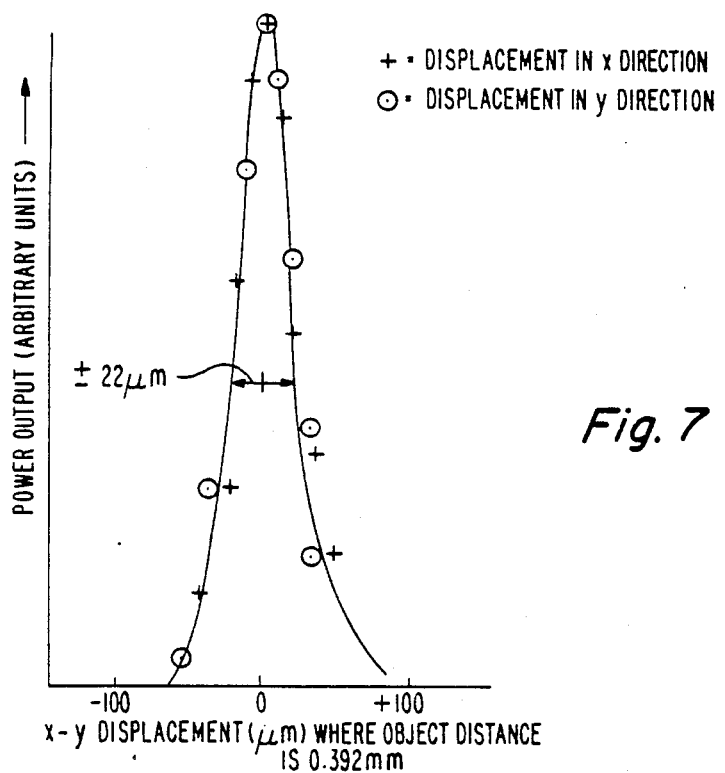
FIG. 7 is a graph showing the power out of the fiber as a function of the x-y displacement of the second lens assembly.

To make tolerance measurements, the second lens assembly conprising the fiber and second lens was first displaced along the x and y (orthogonal) axes. The graph in FIG. 6 illustrates the variation in power output of the fiber relative to deviations in alignment along the x and y axes. Secondly, the assembly was angularly deflected in the x and y directions. FIG. 7 shows a graph illustrating the effects of the deflections on the power out of the fiber. The tolerances are determined by the range of deviations or deflections at about one-half on the output power. The displacement tolerance was ±22 μm and the angular tolerance for this package was ±0.8 degrees. The two lens assemblies were subsequently joined (soldered) together with these tolerances.

EXAMPLE II

The same lenses and procedure were used in this Example as in Example I, except the laser was placed 33 μm from the surface of lens 1 providing an object distance of 0.408 mm (still within the 0.438 mm focal length for lens 1).

Figure 8:
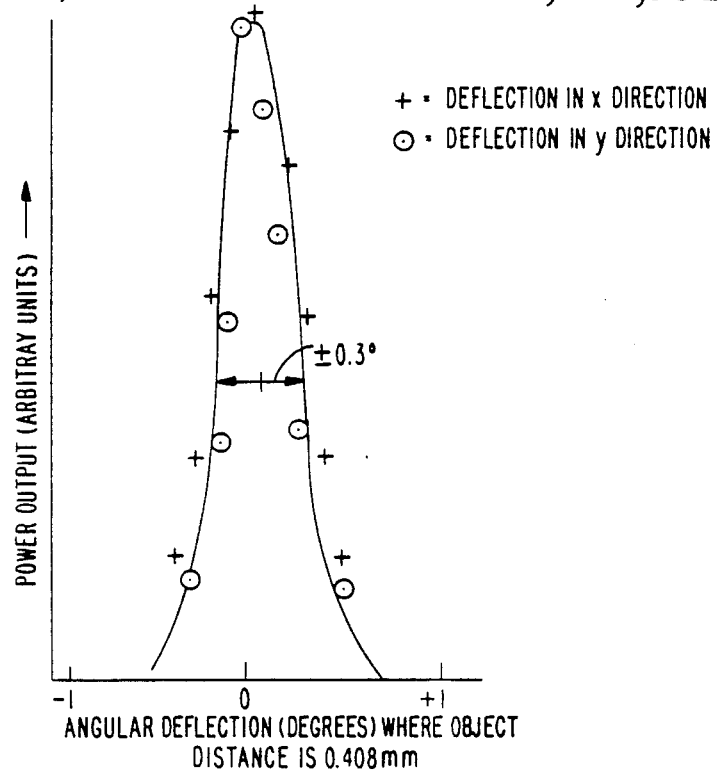
FIG. 8 is a graph showing the power out of the fiber as a function of the angular defection of the second lens assembly.
Figure 9:
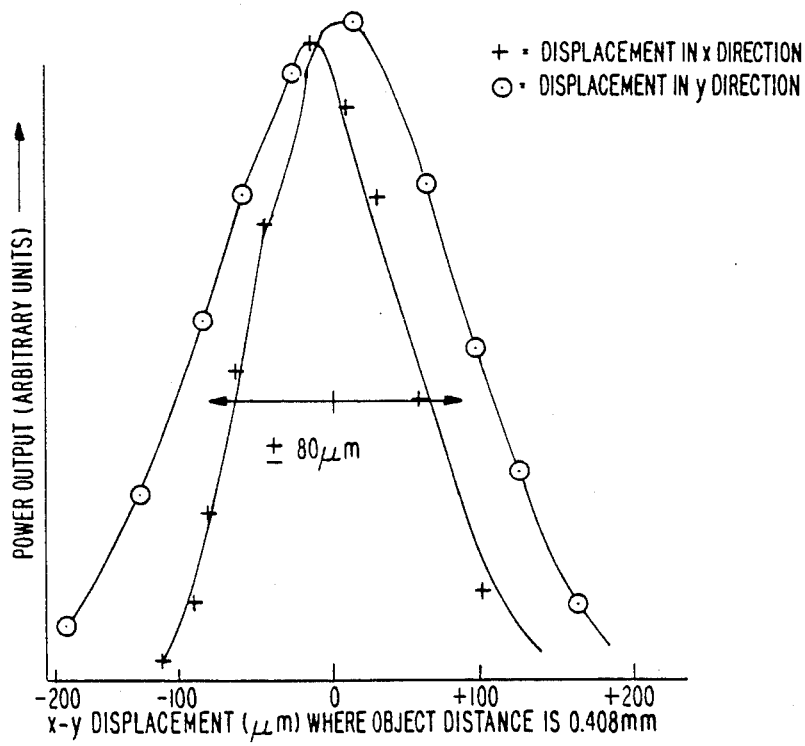
FIG. 9 is a graph showing the power out of the fiber as a function of the x-y displacement of the second lens assembly.

The graphs in FIGS. 8 and 9 show the power output versus x and y displacement and angular deflection, respectively. The displacement tolerance for this system was ±80 and the angular tolerance was ±0.3 degrees.

The graphs in FIGS. 6–9 illustrate that when the object distance from the laser to the first lens is low (as in Example I), the primary benefit is a higher angular tolerance. As the object distance approaches the focal length for the first lens, the angular tolerance decreases somewhat, but the displacement tolerance is significantly enhanced. Thus, in systems sensitive to angular deviations, a shorter object distance for the laser (e.g. Example I) should be used and in the more common case where x-y displacement is a problem, object distances approaching the focal length should be employed.

I claim:

1. An optical package comprising
   a first lens assembly, including a source of divergent light, disposed along the optical axis of a first lens at an object distance less than the focal length of said first lens such that a magnified virtual image of said source is formed; and
   a second lens assembly including a body, having a light acceptance angle less than the divergence angle of said light source, disposed along the optical axis of a second lens, which axis is common with the axis of said first lens, at an object distance greater than the focal length of said second lens such that a magnified real image of said body is formed;
   wherein said images substantially correspond in position along said common axis.

2. The package of claim 1 wherein said focal length of the second lens is defined by the point of convergence of the marginal rays of said light passing through the second lens.

3. The package of claim 1 wherein said source and said body are optical fiber cores.

4. The package of claim 1 wherein said source is the light emitting region of a semiconductor light emitting device.

5. The package of claim 4 wherein said device is a laser.

6. The package of claim 1 wherein said source is an external optical guide.

7. The package of claim 1 wherein said body is an optical fiber core.

8. The package of claim 1 wherein said body is a photodetector.

9. The package of claim 1 wherein said first lens is spherical.

10. The package of claim 9 wherein said first lens has a radius between about 0.2 and 0.5 millimeters.

11. The package of claim 10 wherein said first lens has a radius between about 0.2 and 0.375 millimeters.

12. The package of claim 9 wherein said first lens has an index of refraction between about 1 and 2.

13. The package of claim 12 wherein said first lens has an index of refraction between about 1.75 and 2.

14. The package of claim 1 wherein said second lens is spherical.

15. The package of claim 14 wherein said second lens has a radius between about 3 and 5 times greater than a radius of said first lens.

16. The package of claim 14 wherein said second lens has an index of refraction between about 1 and 2.

17. The package of claim 16 wherein said second lens has an index of refraction of between about 1.75 and 2.

18. The package of claim 1 wherein the virtual image of the light source is magnified between about 10 and 30 times.

19. The package of claim 18 wherein a second object is magnified by the second lens sufficiently to form a real image of the second object corresponding in size to the virtual image of the light source.

20. A method for coupling light from a source of divergent light into an optical fiber, having an acceptance angle less than the divergence angle of said source, comprising the steps of
   forming a first lens assembly by fixing the source along the optical axis of a first lens such that the object distance is less than or equal to the focal length of said first lens, thereby forming a magnified virtual image of the source;
   forming a second lens assembly by fixing an end of said optical fiber along the optical axis of a second lens such that the object distance is greater than the focal length of said second lens thereby forming a magnified real image of the fiber end; and
   coupling the light from said source into said fiber end by placing the optical axes of the first and second assemblies along a common axis and aligning the magnified virtual image of the source with the magnified real image of the fiber end.

21. The method of claim 20 wherein said focal length of the second lens is defined by the point of convergence of the marginal rays of said light passing through the second lens.

* * * * *